United States Patent [19]
Itaya

[11] 4,145,108
[45] Mar. 20, 1979

[54] PHOTO EYEPIECE FOR MICROSCOPES

[75] Inventor: Hideo Itaya, Hachiouji, Japan

[73] Assignee: Olympus Optical Co., Ltd., Tokyo, Japan

[21] Appl. No.: 813,424

[22] Filed: Jul. 6, 1977

[30] Foreign Application Priority Data

Jul. 15, 1976 [JP] Japan ................... 51-84352

[51] Int. Cl.² ............................ G02B 3/00; G02B 9/34
[52] U.S. Cl. ............................ 350/175 E; 350/223
[58] Field of Search ................. 350/175 E, 223

[56] References Cited

U.S. PATENT DOCUMENTS

| | | | |
|---|---|---|---|
| 660,747 | 10/1900 | Bausch | 350/223 X |
| 2,076,686 | 4/1937 | Tronnier | 350/223 |
| 2,991,696 | 7/1961 | Solisch | 350/223 |

*Primary Examiner*—Paul A. Sacher
*Attorney, Agent, or Firm*—Cushman, Darby & Cushman

[57] ABSTRACT

A photo eyepiece for microscopes comprising a front lens group which is a field lens and a rear lens group arranged as a triplet type. The photo eyepiece for microscope is arranged to eliminate lateral chromatic aberration, astigmatism, curvature of image, etc. and to photograph a flat image over a wide field.

4 Claims, 4 Drawing Figures

PHOTO EYEPIECE FOR MICROSCOPES

BACKGROUND OF THE INVENTION (a) Field of the Invention

The present invention relates to a photo eyepiece for microscopes and, more particularly, to a photo eyepiece for microscopes arranged to obtain a favourable image over the whole field at the time of microscopic photographing.

(b) Description of the Prior Art

Known photo eyepieces for microscopic photographing have the following disadvantages. That is, even when a plan-type objective is used, the eyepiece causes astigmatism and curvature of field in the marginal portion. Therefore, especially when the field is wide, it is impossible to obtain a flat image.

SUMMARY OF THE INVENTION

It is, therefore, a primary object of the present invention to provide a photo eyepiece for microscopes arranged to favourably correct lateral chromatic aberration which remains in the objective and, at the same time, to eliminate astigmatic difference and curvature of field so that a flat image is obtained over a wide field in microscopic photographing.

The photo eyepice according to the present invention comprises a front lens group and rear lens group. The front lens group is a field lens arranged to face the objective and converges the rays from the objective. The rear lens group is arranged as a triplet type so that the aperture ratio of the photo eyepiece becomes about F/3.5, spherical aberration, astigmatism and curvature of field are satisfactorily corrected and the cost of production is low.

That is, in the photo eyepiece according to the present invention, the front lens group comprises a first lens which is a positive meniscus lens with its convex surface positioned toward the object or biconvex lens. The rear lens group comprises a second, third and fourth lenses. The second lens component is a biconvex lens, the third lens is a biconcave lens or negative meniscus lens with its convex surface positioned toward the object, and the fourth lens is a biconvex lens. Besides, the photo eyepiece according to the present invention satisfies the following conditions:

$$1.8 < f1/f234 < 3.0 \quad (1)$$

$$0.4 < d2/f < 1.0 \quad (2)$$

$$0.15 < |r6|/f < 0.4 \quad (3)$$

$$1.65 < (n2 + n4)/2 < 1.72 \quad (4)$$

$$0.06 < n3 - n4 < 0.1$$

wherein reference symbol $f$ represents the focal length of the lens system as a whole, reference symbol $f1$ represents the focal length of the first lens constituting the front lens group, reference symbol $f234$ represents the focal length of the rear lens group, reference symbol $r6$ represents the radius of curvature of the surface on the image side of the third lens, reference symbol $d2$ represents the airspace between the front and rear lens groups, and reference symbols $n2$, $n3$ and $n4$ respectively represent refractive indices of the second, third and fourth lenses.

Now, the above conditions are explained below. By selecting the ratio $f1/f234$ between the focal length of the front lens group and focal length of the rear lens group as defined by the condition (1), angle of refraction of principal rays at respective lens surfaces ar limited to adequate values. If this ratio becomes larger than the upper limit of the condition (1), power of the rear lens group becomes too strong and astigmatic difference, curvature of field, etc. will be caused. If this ratio becomes smaller than the lower limit, the image focused by the objective and field lens becomes too large. As a result, it becomes necessary to make the diameter of the field lens large and it is unfavourable in the design of related mechanisms.

If the airspace $d2$ between the field lens and rear lens group becomes larger than the upper limit of the condition (2), lateral chromatic aberration becomes too large. If $d2$ becomes smaller than the lower limit of the condition (2), the image by the objective and field lens will be focused at a position too close to the rear lens group. As a result, fine dust or slight speck on the surface $r3$ of the second lens, if any, will be focused on the film together with the image. Moreover, it becomes necessary to make the power of the first lens large and it becomes impossible to satisfy the condition (1).

The conditions (3) and (4) are established in order to correct lateral chromatic aberration, astigmatism and curvature of field which are caused by the objective and field lens constituting the photo eyepiece according to the present invention.

The surface $r6$ on the image side of the third lens, which is a biconcave or negative meniscus lens, contribute to correction of astigmatism and curvature of field. If the radius of curvature $r6$ of this surface becomes larger than the upper limit of the condition (3), it becomes impossible to eliminate these aberrations fully satisfactorily. If $r6$ becomes smaller than the lower limit of the condition (3), offaxial coma will be aggravated and unfavourable influence will be caused on well-balanced correction of aberrations for the image as a whole. The condition (4) is to correct curvature of field together with the condition (3). If it becomes $(n2 + n4)/2 < 1.65$ in the condition (4), Petzval's sum becomes large and it will be impossible to correct curvature of field favourably. If it becomes $(n2 + n4)/2 > 1.72$, the radius of curvature of the surface $r6$ necessarily becomes small and it becomes impossible to satisfy the condition (3). As a result, symmetry of coma becomes unfavourable. If it becomes $n3 - n4 < 0.06$, the radius of curvature of the surface $r6$ necessarily becomes small and it becomes impossible to satisfy the condition (3). If it becomes $n3 - n4 > 0.1$, Petzval's sum becomes large and it becomes impossible to correct curvature of field favourably.

Besides, when the thickness $d7$ of the fourth lens is selected within the range of $0.08 < d7/f < 0.16$ in addition to the above conditions, it is more advantageous for correction of curvature of field.

DETAILED DESCRIPTION OF THE PREFERRED EMBODIMENTS

Preferred embodiments of the photo eyepiece for microscopes according to the present invention are as shown below.

Embodiment 1:

| f = 1.0 | | | |
|---|---|---|---|
| r1 = 0.3808 | | | |
| | d1 = 0.0876 | n1 = 1.62041 | ν1 = 60.27 |
| r2 = 0.5603 | | | |
| | d2 = 0.7360 | | |
| r3 = 0.6860 | | | |
| | d3 = 0.0678 | n2 = 1.6400 | ν2 = 60.09 |
| r4 = −0.6695 | | | |
| | d4 = 0.1550 | | |
| r5 = −3.2301 | | | |
| | d5 = 0.0290 | n3 = 1.76182 | ν3 = 26.55 |
| r6 = 0.2033 | | | |
| | d6 = 0.0968 | | |
| r7 = 0.3764 | | | |
| | d7 = 0.0968 | n4 = 1.6779 | ν4 = 55.33 |
| r8 = 0.4025 | | | |
| f1 = 1.6139 | | f234 = 0.5832 | |

Embodiment 2:

| f = 1.0 | | | |
|---|---|---|---|
| r1 = 1.7029 | | | |
| | d1 = 0.1210 | n1 = 1.7620 | ν1 = 40.2 |
| r2 = −2.2936 | | | |
| | d2 = 0.7464 | | |
| r3 = 1.1145 | | | |
| | d3 = 0.0814 | n2 = 1.6516 | ν2 = 58.67 |
| r4 = 2.0890 | | | |
| | d4 = 0.0922 | | |
| r5 = 1.4063 | | | |
| | d5 = 0.0352 | n3 = 1.76182 | ν3 = 26.55 |
| r6 = 0.2598 | | | |
| | d6 = 0.0896 | | |
| r7 = 0.3621 | | | |
| | d7 = 0.1496 | n4 = 1.6968 | ν4 = 55.52 |
| r8 = −0.7023 | | | |
| f1 = 1.2995 | | f234 = 0.6262 | |

In the above embodiments, reference symbols r1 through r8 respectively represent radii of curvature of respective lens surfaces, reference symbols d1 through d7 respectively represent thicknesses of respective lenses and airspaces between respective lenses, reference symbols n1 through n4 respectively represent refractive indices of respective lenses and reference symbols ν1 through ν4 respectively represent Abbe's numbers of respective lenses.

Figure 1:
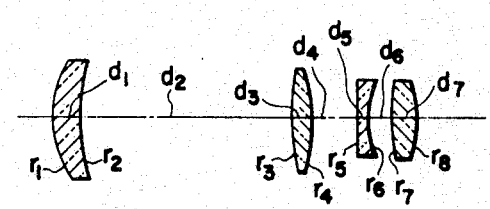
FIG. 1 shows a sectional view of Embodiment 1 of the photo eyepiece according to the present invention.
Figure 2:
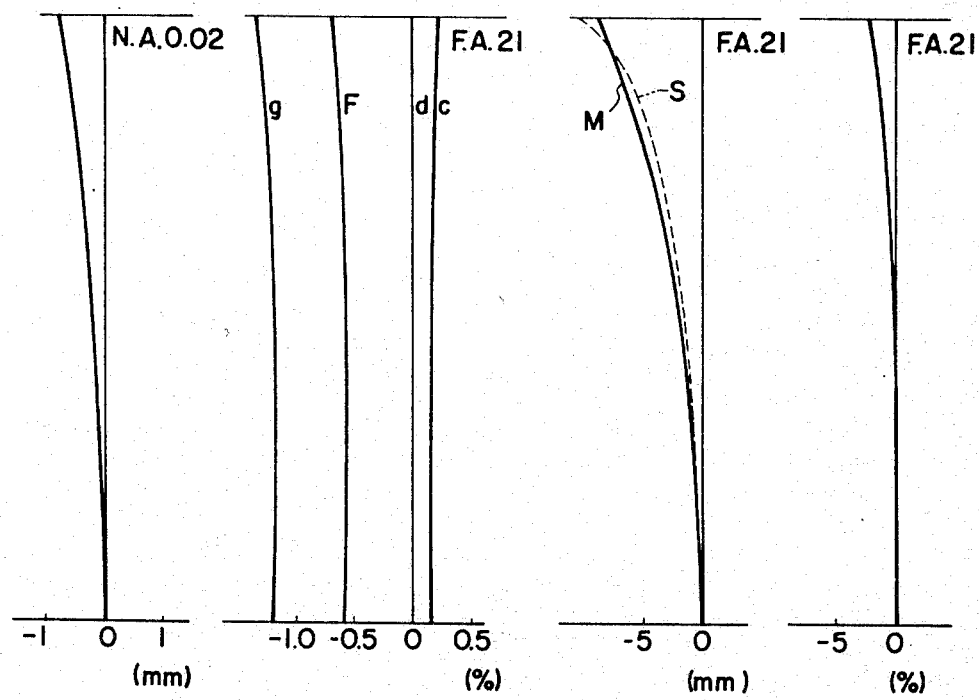
FIG. 2 shows graphs illustrating aberration curves of Embodiment 1.
Figure 3:
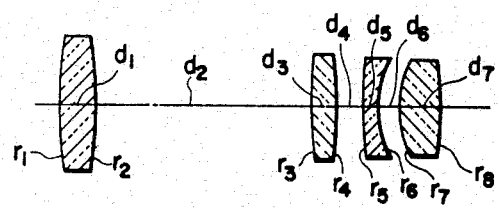
FIG. 3 shows a sectional view of Embodiment 2.
Figure 4:
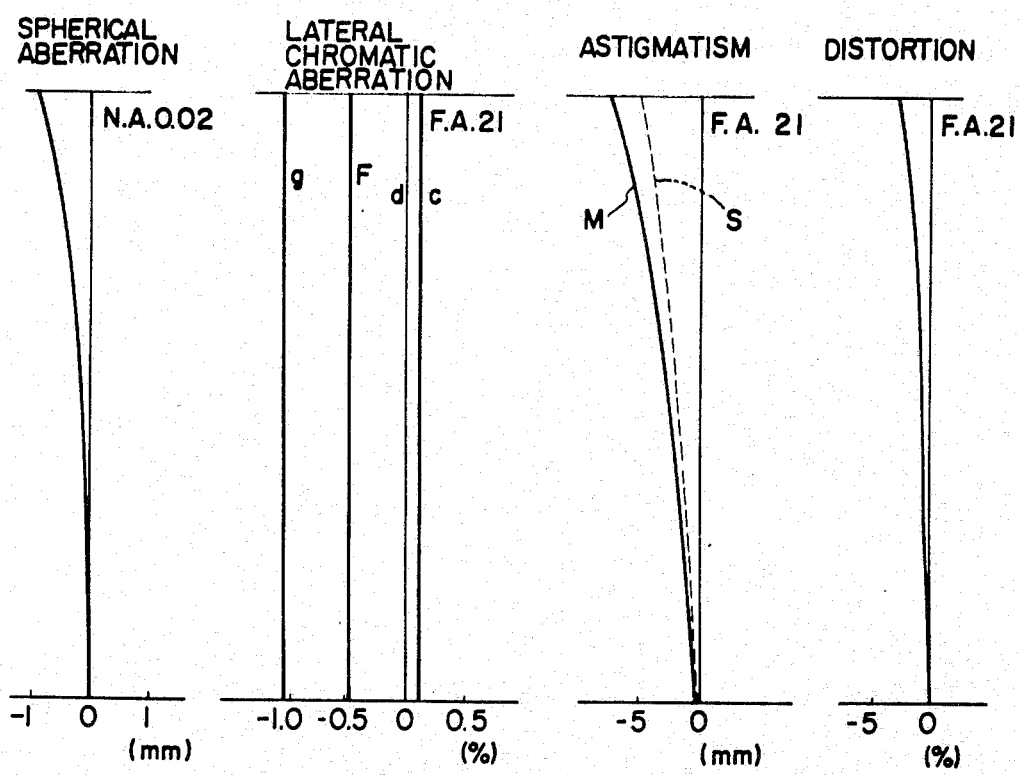
FIG. 4 shows graphs illustrating aberration curves of Embodiment 2.

Out of the above embodiments, Embodiment 1 has lens configuration as shown in FIG. 1 in which the first lens is a positive meniscus lens with its convex surface positioned toward the object side and the third lens is a biconcave lens. Aberration curves of Embodiment 1 are as shown in FIG. 2. Embodiment 2 has lens configuration as shown in FIG. 3 in which the first lens is a biconvex lens and the third lens is a negative meniscus lens with its convex surface positioned toward the object side. Aberration curves of Embodiment 2 are as shown in FIG. 4.

I claim:

1. A photo eyepiece for microscopes comprising a front lens group comprising a first lens and rear lens group comprising a second, third and fourth lenses, said first lens being a positive lens, said second lens being a biconvex lens, said third lens being a negative lens, said fourth lens being a biconvex lens, said photo eyepiece for microscopes satisfying the following conditions:

$$2.0 < f1/f234 < 2.77 \quad (1)$$

$$0.73 < d2/f < 0.75 \quad (2)$$

$$0.2 < |r6|/f < 0.26 \quad (3)$$

$$1.65 < (n2 + n4)/2 < 1.68 \quad (4)$$

$$0.06 < n3 - n4 < 0.084$$

wherein reference symbol f represents the focal length of the lens system as a whole, reference symbol f1 represents the focal length of the first lens, i.e., of the front lens group, reference symbol f234 represent the focal length of the rear lens group, reference symbol r6 represents the radius of curvature of the surface on the image side of the third lens, reference symbol d2 represents the airspace between the front and rear lens groups, and reference symbols n2, n3 and n4 respectively represent refractive indices of the second, third and fourth lenses.

2. A photo eyepiece for microscopes according to claim 1 further satisfying the following condition:

$$0.09 < d7/f < 0.16$$

wherein reference symbol d7 represents the thickness of the fourth lens.

3. A photo eyepiece for microscopes according to claim 1, in which said photo eyepiece for microscopes has the following numerical data:

| f = 1.0 | | | |
|---|---|---|---|
| r1 = 0.3808 | | | |
| | d1 = 0.0876 | n1 = 1.62041 | ν1 = 60.27 |
| r2 = 0.5603 | | | |
| | d2 = 0.7360 | | |
| r3 = 0.6860 | | | |
| | d3 = 0.0678 | n2 = 1.640 | ν2 = 60.09 |
| r4 = −0.6695 | | | |
| | d4 = 1.1550 | | |
| r5 = −3.2301 | | | |
| | d5 = 0.0290 | n3 = 1.76182 | ν3 = 26.55 |
| r6 = 0.2033 | | | |
| | d6 = 0.0968 | | |
| r7 = 0.3764 | | | |
| | d7 = 0.0968 | n4 = 1.6779 | ν4 = 55.33 |
| r8 = −0.4025 | | | |
| f1 = 1.6139 | | f234 = 0.5832 | | wherein reference symbols r1 through r8 respectively represent radii of curvature of respective lens surfaces, reference symbols d1 through d7 respectively represent thicknesses of respective lenses and airspaces between respective lenses, reference symbols n1 through n4 respectively represent refractive indices of respective lenses, reference symbols ν1 through ν4 respectively represent Abbe's numbers of respective lenses, reference symbol f represents the focal length of the lens system as a whole, reference symbol f1 represents the focal length of the front lens group, and reference symbol f234 represents the focal length of the rear lens group.

4. A photo eyepiece for microscopes according to claim 1, in which said photo eyepiece for microscopes has the following numerical data:

| f = 1.0 | | | |
|---|---|---|---|
| r1 = 1.7029 | | | |
| | d1 = 0.1210 | n1 = 1.7620 | ν1 = 40.2 |
| r2 = −2.2936 | | | |
| | d2 = 0.7464 | | |
| r3 = 1.1145 | | | |
| | d3 = 0.0814 | n2 = 1.6516 | ν2 = 58.67 |
| r4 = 2.0890 | | | |
| | d4 = 0.0922 | | |

-continued

```
r5 = 1.4063
       d5 = 0.0352        n3 = 1.76182      ν3 = 26.55
r6 = 0.2598
       d6 = 0.0896
r7 = 0.3621
       d7 = 0.1496        n4 = 1.6968       ν4 = 55.52
r8 = −0.7023
                  f1 = 1.2995         f234 = 0.6262
``` wherein reference symbols r1 through r8 respectively represent radii of curvature of respective lens surfaces, reference symbols d1 through d7 respectively represent thicknesses of respective lenses and airspaces between respective lenses, reference symbols n1 through n4 respectively represent refractive indices of respective lenses, reference symbols ν1 through ν4 respectively represent Abbe's numbers of respective lenses, reference symbol f represents the focal length of the lens system as a whole, reference symbol f1 represents the focal length of the front lens group, and reference symbol f234 represents the focal length of the rear lens group.

* * * * *